United States Patent
Gros et al.

(10) Patent No.: US 9,598,530 B2
(45) Date of Patent: Mar. 21, 2017

(54) POLYMERIC COATING MIXTURE, PROCESS FOR APPLICATION OF THIS COATING MIXTURE TO A METALLIC SUBSTRATE FOR PROTECTION OF AN EDGE OR AN AREA, COVERING, SUBSTRATE COATED IN THIS MANNER AND USE THEREOF

(75) Inventors: Georg Gros, Oppenau (DE); Norbert Maurus, Langen (DE); Karl-Heinz Stellnberger, Niederneukirchen (AT); Marcus Schinzel, Eppstein (DE)

(73) Assignee: Chemetall GmbH, Frankfurt am Main (DE)

(*) Notice: Subject to any disclaimer, the term of this patent is extended or adjusted under 35 U.S.C. 154(b) by 0 days.

(21) Appl. No.: 11/867,272

(22) Filed: Oct. 4, 2007

(65) Prior Publication Data
US 2008/0085958 A1    Apr. 10, 2008

Related U.S. Application Data

(63) Continuation of application No. 10/496,854, filed on Sep. 13, 2004, now abandoned.

(51) Int. Cl.
| | | |
|---|---|---|
| C09D 175/16 | (2006.01) | |
| C08G 18/79 | (2006.01) | |
| C08K 3/36 | (2006.01) | |
| C08K 5/00 | (2006.01) | |
| C08K 5/521 | (2006.01) | |

(52) U.S. Cl.
CPC ......... *C08G 18/792* (2013.01); *C09D 175/16* (2013.01); *C08G 2150/90* (2013.01); *C08K 3/36* (2013.01); *C08K 5/0025* (2013.01); *C08K 5/521* (2013.01); *Y10T 428/25* (2015.01)

(58) Field of Classification Search
CPC   C09D 175/14; C09D 175/16; C08G 2150/90; C08K 3/30; C08K 5/52
See application file for complete search history.

(56) References Cited

U.S. PATENT DOCUMENTS

| | | | | |
|---|---|---|---|---|
| 2,660,909 A | * | 12/1953 | Morse et al. | 72/211 |
| 3,914,463 A | * | 10/1975 | Mercurio et al. | 427/385.5 |
| 4,116,786 A | | 9/1978 | Hodakowski | |

(Continued)

FOREIGN PATENT DOCUMENTS

| | | |
|---|---|---|
| DE | 43 25 886 | 2/1995 |
| DE | 198 13 315 A1 | 9/1999 |

(Continued)

OTHER PUBLICATIONS

Weil, Encyclopedia of Polymer Science and Technology—Phosphorus-Containing Polymers and Oligomers article, 2006, John Wiley & Sons, Inc., pp. 1-31.*

(Continued)

*Primary Examiner* — Elizabeth A Robinson
(74) *Attorney, Agent, or Firm* — McGlinchey Stafford PLLC

(57) ABSTRACT

The invention relates to a coating mixture for applying a polymeric, corrosion-preventing protective layer to a metallic base for protecting an edge area, a soldered point, a weld seam or a repair point or for sealing the seam of one or more optionally interjoined strips, metal sheets or shaped parts.

13 Claims, 1 Drawing Sheet

(56) References Cited

U.S. PATENT DOCUMENTS

Figure 1:
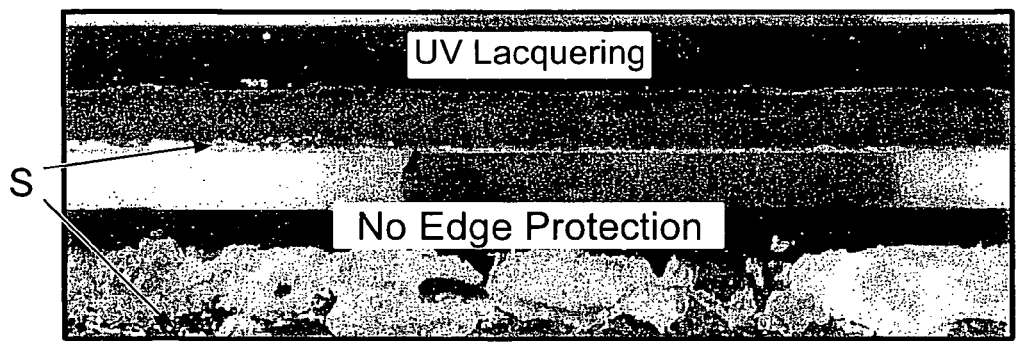

| | | | |
|---|---|---|---|
| 4,230,613 A * | 10/1980 | Wolinski et al. | 156/315 |
| 4,561,950 A | 12/1985 | Leo | |
| 4,640,938 A * | 2/1987 | Romer et al. | 522/79 |
| 4,642,249 A * | 2/1987 | Goll | 427/388.5 |
| 5,128,387 A * | 7/1992 | Shustack | C09D 4/06 522/33 |
| 5,322,861 A * | 6/1994 | Tsuge | C08G 18/10 522/174 |
| 5,338,347 A * | 8/1994 | Rohr | C09D 5/08 106/14.05 |
| 5,891,521 A | 4/1999 | Marumoto et al. | |
| 5,980,619 A * | 11/1999 | Braig et al. | 106/14.12 |
| 6,087,417 A | 7/2000 | Stevenson et al. | |
| 6,245,392 B1 | 6/2001 | Hillenbrand | |
| 6,323,255 B1 * | 11/2001 | Snowwhite | 522/120 |
| 6,332,291 B1 * | 12/2001 | Flosbach et al. | 522/91 |
| 6,677,045 B1 | 1/2004 | Meisenburg et al. | |
| 6,737,468 B1 | 5/2004 | Bremser | |
| 2002/0132059 A1 | 9/2002 | Maddox et al. | |
| 2003/0036604 A1 | 2/2003 | Meisenburg et al. | |
| 2004/0096641 A1 | 5/2004 | Allard et al. | |
| 2005/0186442 A1 * | 8/2005 | Gros | C09D 5/08 428/626 |

FOREIGN PATENT DOCUMENTS

| | | | |
|---|---|---|---|
| DE | 100 13 164 A1 | 9/2001 | |
| EP | 555830 A1 * | 8/1993 | |
| WO | WO 97/22418 | 6/1997 | |
| WO | WO0050527 A1 * | 8/2000 | |
| WO | WO 0075250 A1 * | 12/2000 | C09D 5/08 |
| WO | WO 01/46286 A1 | 6/2001 | |

OTHER PUBLICATIONS

Automotive Body and Related Repairers article downloaded from http://www.bls.gov/oco/pdf/ocos180.pdf on Oct. 26, 2009.*

Koleske et al., Paint and Coating Testing Manual, 1995, American Society for Testing and Materials, Fourteenth Edition, Chapters 27 and 30.*

* cited by examiner

POLYMERIC COATING MIXTURE, PROCESS FOR APPLICATION OF THIS COATING MIXTURE TO A METALLIC SUBSTRATE FOR PROTECTION OF AN EDGE OR AN AREA, COVERING, SUBSTRATE COATED IN THIS MANNER AND USE THEREOF

REFERENCE TO RELATED APPLICATIONS

This application is a continuation of U.S. application Ser. No. 10/496,854 filed Sep. 13, 2004, now abandoned which is a 371 of International Patent Application PCT/EP2002/013594, filed on Dec. 2, 2002, which application claims priority from German Application No. 101 59 552.2, filed Dec. 5, 2001, and from German Application No. 102 17 510.1, filed Apr. 19, 2002. Each patent application identified above is incorporated herein by reference in its entirety.

The invention relates to a coating mixture for application of a polymeric covering to a metallic substrate, the coating mixture containing at least one compound which can undergo free-radical polymerization and at least one photoinitiator. The invention furthermore relates to a process for application of the coating mixture for a polymeric covering in the region of the edge and/or a seam of a metallic substrate and a substrate coated in this manner, in particular a metal strip, metal sheet or a metallic shaped part, and the use thereof.

Metallic strips, sheets and shaped parts are produced in very high piece numbers. Nevertheless, in certain production processes metallic substrates coated with at least one layer of lacquer have an inadequate or even no corrosion protection at cut edges, at edges protected with a dipcoating or at seams, such as e.g. fold seams. To date, no sufficiently corrosion-resistant process capable of rapid coating is suitable for coating with a corrosion-resistant covering which allows protection of the edges and/or the seams.

This requires a very high outlay on plant technology and energy consumption—especially in the case of strip installations which run at a high speed. The speed of strip installations in which curing is to be carried out largely or completely by UV irradiation is currently limited to a speed of up to about 60 or up to about 80 m/min. In the foreseeable future there will be strip installations which will run at coating speeds in the region of up to 160 or even 200 m/min. The investment outlay for this is exceptionally high.

While e.g. the steel sheets for coating of which the mixture described above has been developed have to date usually been chromated to achieve a higher corrosion resistance, there is a move away from this more and more for environmental protection reasons. It is assumed that at least in the automobile industry in the near future practically exclusively metal sheets which have been pretreated without chromates and optionally have also already been lacquered will be employed.

Such non-chromated metallic substrates, that is to say, for example, steel strips or steel sheets, in some cases require, as has now been found, a higher thickness of the polymeric layer applied to them in order to ensure the same corrosion resistance as on chromated sheets. According to the prior art, the dry film layer thickness of the polymeric coating which is applied to the pretreatment coating is often in the range from 10 to 100 µm. Higher demands are then also made on a coating in the region of edges and/or seams.

Conventionally, no e.g. strip-like protection of the edge or seam regions has hitherto been employed. A change in the composition of the polymeric mixtures for the formation e.g. of lacquers for protection of the edges or seams is unavoidable, in order, for example, to achieve a heat resistance up to about 180° C. for drying of an electro-dipcoating which may be applied subsequently and a high resistance to weathering. The adhesive strength of the polymeric covering on the substrate must also usually be higher than customary in order to achieve a high impact resistance. For protection of sharp edges or of edges at seams and their particular adjacent regions, a corrosion protection which is higher than otherwise is conventionally also required. In certain cases it may be necessary also for these high-quality properties already to be achieved with a comparatively thin coating.

Components or sheets with areas which are to be soldered or welded have often been protected beforehand by a polymeric coating, in particular by at least one lacquer layer, such as a primer or clear lacquer. During soldering or welding, these coatings are often severely damaged in the region of the areas exposed to heat during this operation, which are called "soldered points" or "weld seams" respectively in the following, although it should be at least one individual weld point. So-called burning loss occurs. Due to the combustion of polymeric material, troublesome porosity may occur in the soldered or welded region.

Moreover, these areas which have been attacked are often worked mechanically afterwards, in order to even out or smooth the soldered or welded region, the areas with the damaged coating frequently being increased further in size. There is therefore the need for soldered points, weld seams or damaged areas of the coating (so-called "other areas") to be covered subsequently with a protective coating which is limited in its area and which usually should project a little beyond the damaged areas. Such a sealing of the weld seam or repair sealing is of interest in particular on components of aluminium alloys, magnesium alloys and steel.

Moreover, the steel producers desire in particular coating mixtures which render possible complete treatment and coating in one production unit, without interruption, of the steel or steel sheet subsequently supplied to the further processors. To date, the steel strips and sheets are generally galvanized or, if desired, chromated and subsequently wound on rolls by the producer after the end of the rolling process. The rolls of the metallic strip obtained in this way (coils) are then transported to the coating unit in which the polymer-containing coating is applied. Transportation to the coating unit and the unwinding and winding up of the rolls are undesirable cost factors which are to be avoided. Other types of repair points, e.g. on polymeric coatings which are incomplete, inadequate and/or too thin or/and on reworked areas, could also be protected by this means.

The Applicant has hitherto known no use of a lacquer or a lacquer-like coating in an automated process which is applied to strips, sheets or shaped articles and is intended only for protection of the edge or the seam. In automobile construction or aircraft construction, protection of edges and seams is utilized, in particular, by injection of hollow cavity waxes and the use of sealing compositions or rubber lips.

Coatings e.g. of a phosphating and an electro-dipcoating also are completely inadequate in respect of their corrosion protection. A substitute for a cathodic dipcoating also proves to be no better.

A UV-curable coating mixture which enables pretreatment and coating with a polymer-containing covering to be carried out on a strip, sheet or shaped part in a single production unit (so-called inline process) is desired. For this, particular requirements are imposed on the curability of the coating mixture. Galvanizing of a steel sheet is generally carried out at speeds from approx. 60 m/min. In order to ensure a problem-free process without intermediate storage, coating, including curing, must also be carried out at such speeds. Coating mixtures with which the layer obtained has a sufficient hardness and which, where appropriate, allow coating at these high speeds are therefore desired.

The object of the present invention is to provide coating mixtures which give, where appropriate also without prior chromating, phosphating or/and other surface pretreatment, a high corrosion resistance and adhesive strength in the region of edges, soldered points, weld seams, repair points and/or seams. These coating mixtures should furthermore be suitable for application on fast strip installations or/and for automatable coating on edges or/and seams of cut sheet lengths or shaped parts. These coating mixtures should furthermore be as far as possible low in or free from heavy metals and, where appropriate, it should be possible for them to be applied to pretreatment coatings, which are optionally chromium-free. Finally, there is the object of proposing a suitable process for application of such coating mixtures which renders it possible to achieve the outstanding properties reliably and reproducibly.

The object is achieved with a coating mixture, in particular with a coating composition, for application of a polymeric, corrosion-preventing covering to a metallic substrate for protection of an edge region, a soldered point, a weld seam, a repair point or/and for sealing the seam of one or more strips, sheets and/or shaped parts optionally joined to one another, wherein the coating mixture is preferably largely or entirely free from water or/and organic solvent, wherein it contains at least one binder which can undergo free-radical polymerization and at least one compound which forms free radicals under the action of actinic radiation, and wherein, under actinic irradiation, the compound which can undergo free-radical polymerization is largely or completely cured with the free radicals formed.

The object is also achieved with a coating mixture, in particular with a coating composition, for application of a polymeric, corrosion-preventing covering to a metallic substrate for protection of an edge region, a soldered point, a weld seam, a repair point and/or for sealing the seam of one or more strips, sheets and/or shaped parts optionally joined to one another, wherein the coating mixture is preferably largely or entirely free from water or/and organic solvent and contains at least one binder which can undergo free-radical polymerization, at least one post-crosslinking compound and at least one compound which forms free radicals under the action of actinic radiation, and wherein, under the actinic irradiation, the compound which can undergo free-radical polymerization is not cured completely at temperatures in the range from 10 to 200° C. with the free radicals formed, but still has reactive bonds which lead to substantial or complete curing in contact with the post-crosslinking compound(s).

The term "under actinic irradiation" also includes the curing concluded in the shortest time during and immediately after the end of the irradiation. Actinic radiation is to be understood as meaning that radiation of which the frequency or energy is suitable or sufficient for activation of the polymerization initiator (=photoinitiator). It should usually have at least the energy or the frequency of visible light or of UV light. Short-wavelength visible and/or ultraviolet light (UV light) is preferred. Any radiation of shorter wavelength, that is to say higher energy, is of course also suitable. Thus e.g. electron radiation, with which the use of a photoinitiator is not necessary, can also be employed. The chemical reactions initiated by the actinic radiation are also called actinic curing or crosslinking or UV curing, where in the context of this Application UV curing is to include curing under any type of actinic radiation. The actinic curing is preferably carried out in the temperature range from 12 to 185° C., particularly preferably at 15 to 140° C., in particular at room temperature.

The term "edge" in the context of this Application includes, in the case of strips or sheets in particular, at least two edges and the area in between, which is usually produced by cutting or stamping. The term "edge region" moreover also includes the adjacent areas of the upper and lower surface e.g. of the sheet. Wrapping around beyond the edge area as a rule produced by cutting or stamping to the two adjacent regions of the adjacent surfaces takes place here. "Seam" in the context of this Application can be, in particular, a fold seam, a joint, a crevice seam or a region at which at least two sections are led substantially in parallel and end or/and are angled there, as a result of which an opening, a crevice, a joint or a fold between at least two sections is formed, this often being particularly at risk from corrosion and usually is not closed e.g. by welding or soldering or/and sealed e.g. by wax. The seam can be formed by at least one section, which is substantially U-shaped or/and substantially has the structure of an incompletely closed O-shape, of at least one strip or/and one sheet, it being possible for the further sections to be of any desired shape and optionally also pushed together and optionally also joined. Joining can be carried out here above all by clinching, gluing, soldering and/or welding, chiefly by spot welding. The most diverse forms of fold seams, joints, guides, seams, crevice seams and pins can be formed, chiefly in adhesive-, solder- and weld-free joining techniques, these being called in Anglo-Saxon e.g. corner slide connection, cup clip, drive cleat, hem, New England cleat, Pittsburgh lock, standing S cleat, standing seam or standing slip. In German e.g. the terms edging, joining, wedging, cramping, locking or closure of the border, fold seam, joint, edge, seam, channel, impact point or of the flange or joint are used. In this context, as a rule at least the edge or/and a crevice of such a joining technique is incompletely protected from corrosion.

It is particularly preferable simultaneously to protect at least one edge and at least one seam, such as e.g. on the lower edge of doors, in particular on automobiles. On automobile doors, the outer sheet is often trimmed inwards. In this context, not only the U-shaped inwards-trimmed lower edge but also the closure of the seam at the ending of the inwards-trimmed sheet is to be protected, since very severe corrosion phenomena often occur here.

The coating mixture for application of the polymeric covering, which is often called "polymeric mixture" or "mixture for a polymeric covering" in the following, is preferably prepared with only an addition of water or of organic solvent, particularly preferably with only an addition of water and very particularly preferably entirely without the addition of water or/and organic solvent. Without addition of water or of organic solvent, this mixture contains water or organic solvent only in traces or as a residual constituent of the raw materials already added or from the moisture of the atmosphere. The contents of water or of organic solvent are then preferably not more than in each case 5 wt. %, particularly preferably not more than in each case 2 wt. %, in particular not more than in each case 1.5 or 1 or 0.5 wt. %. If an addition of water or/and organic solvent is desired, it is advisable to add completely demineralised water or/and to limit the addition as far as possible to small amounts. Amounts of up to 10 wt. % water or/and of up to 10 wt. % organic solvent are preferred here, in particular amounts of up to 5 wt. % water or/and of up to 5 wt. % organic solvent, because the outlay on drying and the drying time are lower and because the covering thereby formed—if necessary—can be excited to curing and cured by the action of actinic radiation faster or at a shorter distance from the region of the application of the polymeric mixture. If higher contents of organic solvent are used, the viscosity of the coating mixture decreases relatively severely and, depending on the composition, at e.g. more than 5 or also at e.g. more than 20 wt. % of organic solvent, this can no longer be employed for coating edges or also can no longer be applied in every form because the viscosity is too low.

In the presence of post-crosslinking compounds, thermal curing can be initiated or started, if required, directly after the UV station, behind the region of actinic curing or also at a longer distance thereafter. If the coating mixture were not to be cured actinically beforehand, the coating mixture can in many cases otherwise become too thinly liquid and run off the metal substrate and the edges could be inadequately covered.

If required, the metallic substrate can have an elevated temperature, in particular a temperature in the range from 20 to 150° C., preferably in the range from 20 to 80° C., particularly preferably in the range from 25 to 50° C., in order to render possible drying or residual drying of the polymeric covering e.g. from the atmospheric moisture up to irradiation with actinic radiation. However, if a minimum amount of water or organic solvent should still be present in the polymeric covering at the start of the actinic irradiation, formation of gas bubbles and breaking up or/and opening up of parts of the covering (so-called formation of boiling marks) can easily occur.

The polymeric mixture is preferably formulated to be particularly reactive by elevated contents of at least one photoinitiator, in particular in the range from 7 to 15 wt. %, in order to achieve a rapid and as far as possible substantial thorough curing even in thicker layers. Alternatively, the radiation dose can be increased or a more reactive polymer which cures by free radicals can be employed. These measures can also be combined with one another as desired. A high degree of crosslinking, in particular also a through-crosslinking, is thereby rapidly achieved.

A high dry film layer thickness is moreover required in many intended uses. If the actinic irradiation is carried out directly after application of the coating mixture in the edge region, the coating, which is often formed drop-like in cross-section, cannot flow so severely and then often has a thickness in the range from 50 μm to 800 μm at the thickest point of the often drop-like coating, the directions of the greatest thickness being measured in a transverse section.

This mixture is preferably largely or entirely free from chromium or/and further heavy metals, such as e.g. cadmium, nickel, cobalt or/and copper. It is conventionally also free from constituents of good electrical conductivity, such as e.g. electrically conductive particles, such as e.g. zinc, carbon black or iron phosphide.

The coating mixture according to the invention can contain a content of at least one compound which can undergo free-radical polymerization, it being possible for the total content of compounds which can undergo free-radical polymerization to be, in particular, in the range from 15 to 70 wt. %, based on the dry substance. Their total content is preferably in the range from 20 to 60 wt. %, particularly preferably in the range from 28 to 54 wt. %, very particularly preferably in the range from 36 to 50 wt. %, above all in the range from 40 to 48 wt. %. Preferably, at least 40 wt. % of the total content of these binders is present with a molecular weight of at least 2,000, particularly preferably at least 50 wt. %, very particularly preferably at least 60 wt. %.

Binders based on acrylate, methacrylate, epoxide, polyester or/and urethane can be employed in particular as the compound which can undergo free-radical polymerization, in particular epoxyacrylate, polyester acrylate, urethane acrylate or/and mixtures thereof of varying basic chemistry or/and varying molecular weights. Binders chiefly based on epoxy resin can have poor properties because of detachment of the coating. However, if mixtures with an epoxy resin content with which the coating does not become detached from the substrate are used, e.g. those with urethane acrylate or/and with polyester acrylate, the corrosion protection is then also very good due to the epoxy resin content.

The coating mixture according to the invention can optionally contain at least one binder which renders possible post-crosslinking, it then being possible for the total content of the at least one post-crosslinking compound to be, in particular, 0.3 to 30 wt. %, based on the dry substance. Its total content is preferably in the range from 1 to 25 wt. %, particularly preferably in the range from 1.5 to 20 wt. %, very particularly preferably in the range from 1.8 to 15 wt. %. It is therefore possible to effect only part of the crosslinking by UV curing and thereafter to effect a gradual post-crosslinking, which optionally extends over about 12 days. The post-crosslinking can extend over some days at room temperature and can be accelerated by elevated temperature or/and in the presence of a catalyst for the post-crosslinking compound, such as e.g. dibutyltin laurate (DBTL). The post-crosslinking may take place slowly in the presence of such binders at room temperature and contribute towards further polymerization. At elevated temperature a more intense and faster post-crosslinking takes place. However, if masked binders are employed, the masking must first be broken open chemically by means of heat at about at least 90° C. before the thermal crosslinking can take place. With masked post-crosslinking compounds it is thus possible to start the further curing at a later point in time in a targeted manner, as long as no exposure to elevated temperature occurs beforehand. Examples of preferred post-crosslinking compounds include isocyanates and isocyanurates, which conventionally act as hardeners or crosslinking agents. These can be based e.g. on 2,4- or 2,6-toluene-diisocyanate (TDI), 4,4'-methylene-di(phenyl)isocyanate (MDI) or hexamethylene-diisocyanate (HDI). Isocyanates and isocyanurates based on HDI or/and TDI are preferably used. The post-crosslinking compounds react with the free OH and polyol groups of the UV-curing resin to form polyureas, which as is known are very stable compounds, and related chemical compounds.

In addition to the binders which cure by means of free radicals, small contents of thermosetting binders, such as e.g. EDC binders, can be present. However, the content of EDC binders only makes sense if masked post-crosslinking compounds are employed. Otherwise, the actions of the EDC binders would not be utilized sufficiently. An addition of thermosetting binders is advantageous only in the case of addition of at least one masked post-crosslinking compound, when thermosetting binders are also present, since otherwise the reactivity and the advantages of the coating mixture according to the invention would be utilized inadequately or in an impaired form. The content of purely thermosetting binders should preferably not exceed 20 wt. %, in particular 10 wt. %, based on the dry matter.

Furthermore, the coating mixture according to the invention should have no or only the lowest possible content (in total not more than 5 wt. %) of filler or/and pigment having a relatively high or high absorption in the spectral region of the actinic irradiation chosen, in particular UV radiation. The addition of only a low content of corrosion-preventing pigment is therefore conventionally advantageous. In many cases, the visually detectable colouring or absorption of many pigments moreover causes trouble.

The coating mixture according to the invention can include a content of at least one compound which forms free radicals under the action of actinic radiation (so-called photoinitiators), it being possible for the total content of compounds which form free radicals to be, in particular, in the range from 3 to 15 wt. %, based on the dry substance. Their total content is preferably in the range from 4 to 11 wt. %, particularly preferably in the range from 5 to 10 wt. %, very particularly preferably in the range from 6 to 9 wt. %. Under the action of actinic radiation, in particular UV radiation, the at least one photoinitiator forms free radicals which react with the binder which can undergo free-radical polymerization and incompletely or completely crosslink this during and, where appropriate, shortly after the actinic irradiation. The compounds which can undergo free-radical polymerization have unsaturated polymerizable groups which can react with the groups formed, by initiation by radiation, from the photoinitiator and can form a water-insoluble network. After this chemical reaction, this binder can, where appropriate, still contain reactive groups, such as OH and polyol groups, which can limit the chemical resistance and the corrosion resistance of the coating formed therefrom.

The coating mixture according to the invention can contain at least one monomer, it being possible for the total content of monomers to be, in particular, in the range from 1 to 60 wt. %, based on the dry substance. Their total content is preferably in the range from 10 to 50 wt. %, particularly preferably in the range from 15 to 45 wt. %, very particularly preferably in the range from 20 to 40 wt. %. The monomers have the task of rendering the coating mixture as thinly liquid as possible, without water or/and organic solvent therefore having to be added, and are therefore also called reactive diluents. Suitable monomers are, above all, those which are as far as possible water-resistant after curing, which react particularly reactively with the binder which can undergo free-radical polymerization and with the photoinitiator, which do not render the film more brittle or/and which ensure good adhesion to the substrate. The molecular weight of the monomers is advantageously in the range up to 500. Preferred types of monomers are those based on acrylate or/and on methacrylate. Hydroxypropyl methacrylate monomer (HPMA), isobornyl acrylate monomer and hexanediol diacrylate monomer (HDDA) are particularly preferred. The monomers can be mono- or difunctional, monofunctional monomers usually not adversely influencing the elasticity. A portion or all of the monomer(s) can be replaced by addition of water or/and organic solvent.

The coating mixture according to the invention can contain at least one adhesion promoter, it being possible for the total content of adhesion promoters to be, in particular, in the range from 0.1 to 25 wt. %, based on the dry substance. Their total content is preferably in the range from 5 to 20 wt. %, particularly preferably in the range from 6 to 17 wt. %, very particularly preferably in the range from 7 to 14 wt. %. Phosphoric acid esters can be employed in particular as adhesion promoters. They serve to pickle the substrate at a low pH and thereby ensure better anchoring of the subsequent layer.

The coating mixture according to the invention can contain at least one corrosion prevention pigment, it being possible for the total content of corrosion prevention pigment to be, in particular, in the range from 0.1 to 15 wt. %, based on the dry substance. Its total content is preferably in the range from 1 to 12 wt. %, particularly preferably in the range from 2 to 10 wt. %, very particularly preferably in the range from 3 to 8 wt. %. Corrosion prevention pigments which can be employed are, in particular, those based on oxide, phosphate, phosphide or/and silicate. Silicatic pigments are particularly preferred because they buffer the hydrogen ions in the coating mixture and thereby allow no corrosion to start in the first place.

The coating mixture according to the invention can contain at least one lubricant, such as e.g. graphite or/and polyethylene wax, it being possible for the total content of lubricant to be, in particular, in the range from 0.05 to 5 wt. %, based on the dry substance. Its total content is preferably in the range from 0.2 to 4 wt. %, particularly preferably in the range from 0.5 to 3 wt. %, very particularly preferably in the range from 0.8 to 2.5 wt. %. An addition of lubricant is often to be recommended only if the surfaces treated in this manner are to be subsequently shaped, but not glued.

The coating mixture according to the invention can contain at least one of the additives mentioned in the following, such as e.g. thixotropy auxiliaries, defoamers, surface additives to increase the scratch resistance, additives for wetting the substrate, such as, in particular, for adhesion to electro-dipcoating layers or to electro-dipcoating substitute layers, and adhesion promoters, e.g. for adhesion to the metallic substrate, to electro-dipcoating layers or to electro-dipcoating substitute layers, such as e.g. phosphoric acid esters, it being possible for the total content of such additives to be, in particular, in the range from 0.05 to 10 wt. %, based on the dry substance. Their total content is preferably in the range from 0.3 to 8 wt. %, particularly preferably in the range from 1 to 6 wt. %, very particularly preferably in the range from 2 to 5 wt. %. A defoamer serves to ensure that as far as possible no air bubbles are included in the coating applied and thus no pores are formed in it. The wetting agent ensures adhesion promotion on the substrate.

The coating mixture according to the invention is preferably free from colouring constituents and will then have only a weak or no colour shade, including as the cured polymeric covering. It is preferable to produce as far as possible a colourless, clear or at least transparent polymeric covering.

The coating mixture according to the invention can contain up to 10 wt. % of 5 water or/and a total content of organic solvents of up to 10 wt. %. These contents are calculated over the 100% of the dry substance. They can also be a mixture of at least one organic solvent with water or a mixture of at least two organic solvents. Thinly liquid solvents which require no labelling are preferably suitable in particular as organic solvents, or esters, ketones, glycol ethers and aromatic hydrocarbons, such as e.g. xylene, in particular propylene glycol ethers. They preferably have a good diluting property for the binders and are readily volatile. Such a content can counteract the advantageous effects of the coating mixture and the advantageous properties of the process according to the invention, especially if it is somewhat higher. The viscosity can in principle also be adjusted with water or organic solvent as desired. Nevertheless, in many cases it is preferable to establish the viscosity at least in part by the content and the nature of the monomer or monomers. The adjustment of the viscosity has a particular importance especially in the protection of edges, so that the coating mixture on the one hand is not applied in a non-uniform shape because its viscosity is too high and on the other hand runs off from the edge and in particular from the burrs which are also to be protected because its viscosity is too low, leading to the production of polymeric coverings which are too thin or partly or perhaps even incompletely closed (see FIG. 2).

The coating mixture according to the invention can have a viscosity in the range from 1,000 to 60,000 mPa·s. The viscosity is preferably in the range from 2,000 to 50,000 mPa·s, particularly preferably in the range from 2,500 to 40,000 mPa·s. Because of the usually comparatively high viscosity, such as is preferable for protection of edges, it is no longer possible to apply the coating mixture according to the invention in a uniform and even manner on large areas on an industrial scale. Higher values of the viscosity will be chosen here, especially for worm application, preferably those in the range from 30,000 to 50,000 mPa·s. On the other hand, lower values of the viscosity will be chosen in particular in the case of brush application, preferably those in the range from 1,000 to 10,000 mPa·s. At viscosities in the range from 1,000 to 2,500 mPa·s, however, there is the risk that the layer applied flows rapidly, forms only a thin wet film layer and also has an increased shrinkage on drying because of the increased solvent contents then conventionally contained therein, so that the dry film layer thickness as a result is still much lower. Precisely projecting areas and burrs can then have particularly thin or even partly missing and then under certain circumstances inadequately corrosion-preventing polymeric coverings. Coating mixtures having viscosities in the range from 1,000 to 2,000 mPa·s usually cannot be employed for the protection of edges and also not for sealing of every seam. However, under certain circumstances they are suitable for minor repair work on lacquer defects or reworking points. Values of the viscosity in the range from 20,000 to 40,000 mPa·s are utilized in particular for spraying, misting or rolling. Because of the comparatively high viscosity for use on the edge or as a seam seal, without a crevice being filled, such a coating mixture according to the invention is not suitable for application over a large area. However, it can also be employed over small areas for repair work. The viscosity is in some cases to be adjusted, in connection with the wetting, quite accurately to the particular use conditions, so that the coating mixture does not flow too thinly or even partly pull back on projecting areas, such as corners and burrs. For edge protection, in addition to good wrapping around the edge, a particularly good wetting, that is to say a surface tension which is as low as possible, is therefore often required. Rapid curing after coating with the coating mixture according to the invention is advantageous in order to avoid subsequent changes or damage to the coating which has not yet cured.

The object is furthermore achieved with a process for the production of a polymeric, corrosion-preventing covering on a metallic substrate in the region of an edge, a soldered point, a weld seam, a repair point or/and a seam, which is characterized in that a coating mixture—in particular a coating composition for application of a polymeric, corrosion-preventing covering on a metallic substrate for protection of an edge region, a soldered point, a weld seam, a repair point or/and for sealing the seam of one or more strips, sheets or/and shaped parts which are optionally joined to one another—in the form of a polymeric mixture which optionally contains water or/and organic solvent is applied to a part of the surface of the metallic substrate in the region of an edge, a soldered point, a weld seam, a repair point or/and and a seam, preferably on a strip, sheet or shaped part in the non-coated or in the partly or completely coated state, wherein this coating can be e.g. a metal layer, metallic alloy layer, pretreatment layer or/and lacquer layer, and in that the polymeric mixture is dried, if appropriate, and the coating applied is irradiated with actinic radiation of such an intensity and for such a period that a firmly adhering, ductile, corrosion-preventing coating is formed.

Strips and sheets here often have a layer thickness in the range from 0.05 to 3 mm thick, in particular in the range from 0.1 to 2 mm thick.

Although in principle any type of metallic substrate and substrates of any metallic composition can be used, strips, sheets or shaped parts of aluminium, of an aluminium alloy, of a magnesium alloy, of steel or/and of a strip or sheet coated with a metal are preferably used here. Cold-rolled steel (CRS) or deep-drawn steel is used in particular as the steel quality. The metallic coating of the metallic substrate can be, in particular, one based on alloys of AlSi, ZnAl, such as Galfan®, AlZn, such as Galvalume®, ZnFe or ZnNi, such as Galvanneal® and other Al alloys or Zn alloys. The metallic coating can be carried out galvanically by coating with a melt, such as e.g. as hot galvanization, which is produced in particular by dipping, or in an aqueous bath by electrochemical processes. The metallic substrate here can, in particular, have been galvanized electrolytically (ZE) or hot galvanized (Z) with a zinc-containing alloy. Any type of coating, including those according to the invention, can in principle be carried out on one or on both sides of the metallic strip or sheet.

If a powder lacquer were to be employed instead of the polymeric mixture which cures actinically, this lacquer would have to be stoved for a relatively long time—usually for 10 to 30 minutes—and usually at temperatures in the range from 120 to 180° C., which would often lead to a covering which is too hard and to a coating of the substrate over the entire area, and easily leads to the liquid lacquer pulling back again at burrs and projecting areas during stoving because of the surface tension and to some of the burrs becoming exposed.

Burr in the context of this Application is understood here as meaning, in particular, cutting burrs and stamping burrs which may occur in the edge region during stamping, cutting, shaping etc. Under certain circumstances, these burrs project up to about 100 µm, above all in the case of cutting and especially if the tools, such as e.g. guillotine shears, are already worn out somewhat or more severely, or often protrude out of the metallic substrate up to about 1 mm in the bent state. The length of the burrs can vary to any extent.

If a lacquer with a high content of water or/and organic solvent is used, in particular at a high content of water or/and organic solvent of more than 5 or 10 wt. % in total, based on the dry substance, there may in some cases be the risk that a portion of the burrs is exposed because of the surface tension of the coating mixture applied. Furthermore, a high content of water or/and organic solvent has the disadvantage that these constituents do not always escape rapidly enough and can severely impair the subsequent actinic curing.

On the other hand, a polymeric mixture which is partly, largely or completely cured by means of actinic radiation usually shows a volume shrinkage only in the range from 1 to 5%. This also contributes to the burrs not being able to be exposed so easily and to stresses not being able to be built up and cracks formed so easily inside the lacquer.

It is particularly preferable to employ the process according to the invention in automated form. In this context, on the one hand coating can be carried out on a strip installation, but on the other hand coating can also be carried out along the edges, soldered points, weld seams, repair points and seams of sheets or shaped parts e.g. in a strip of given width. Coating of the edge region can also be carried out by a procedure in which a stack of sheets or shaped parts with a distance from sheet to sheet or from shaped part to shaped part or a coil (roll of strip) in which the strip is kept at a distance can be coated from one side and can also be irradiated actinically or/and heated from this side.

In the process according to the invention, the metallic substrate can have a surface substantially comprising aluminium, steel or/and an alloy comprising aluminium, iron, magnesium, titanium or/and zinc, it also being possible for this surface additionally to be provided with at least one pretreatment layer. This pretreatment layer can then be, inter alia, a coating based on phosphate, in particular based on ZnMnNi phosphate, or based on phosphonite, silane or/and a mixture based on a fluoride complex, corrosion inhibitor, phosphate, polymer or/and finely divided particles. The processes hitherto employed most frequently for surface treatment or pretreatment before lacquering of metals, in particular of metal strip, are based on the use of chromium (VI) compounds or/and phosphate(s), optionally together with at least one of various additives.

Because of the toxicological and ecological risks such processes involve and moreover because of the foreseeable legal restrictions in respect of the use of chromate-containing processes, alternatives to these processes have already been sought for a relatively long time in all fields of metal surface treatment. The pretreatment solution(s) and the coating(s) formed therefrom are therefore preferably chromium-free. In the context of this Application, activating solutions, passivating solutions and after-rinsing solutions are also called a pretreatment solution here; coatings of an activating solution, a passivating solution or an after-rinsing solution are also called a pretreatment layer or pretreatment here. It is furthermore preferable to keep the contents of heavy metals of these solutions and coatings as low as possible or to avoid them completely, in particular contents of cobalt, copper or/and nickel, which nowadays are often used in small or certain contents because of their advantages.

In the process according to the invention, the metallic substrate can (additionally) be covered with at least one pretreatment layer, with at least one lacquer layer or/and at least one lacquer-like layer, before the polymeric mixture according to the invention is applied. This lacquer layer or/and lacquer-like layer can advantageously be of a composition such that it contains many electrically conductive particles or constituents. In the case of soldered points or weld seams or in the sealing of seams in particular, it may therefore be advantageous to apply a so-called weld primer before the coating mixture according to the invention is applied.

The metallic substrate, which is optionally already coated, here can also be coated with a polymeric covering in the region of the edge or/and the seam on each side of the edge and over the edge or along the seam and over the seam, preferably to a width of in each case 0.5 to 20 mm from the edge or seam—conventionally to both sides—it being possible for the edge to be untreated or coated, and it being possible for that first coating to comprise in each case at least one layer of a pretreatment solution, a lacquer or/and a lacquer-like layer. In the case of a soldered point, a weld seam or a repair point, it is also advantageous to allow the coating according to the invention to protrude at each edge, preferably by this width.

In the process according to the invention, the metallic substrate, which is optionally already coated, can be closed and optionally filled to a slight degree with a more thinly liquid coating mixture in the region of the seam where there is a hollow cavity, such as e.g. a crevice, the coating mixture here preferably having a viscosity in the range from 1,000 to 20,000 mPa·s, preferably 2,500 to 15,000 mPa·s, measured with a cone/plate viscometer at room temperature in the agitated state. Low viscosities, in particular in the range from 1,000 to 8,000 mPa·s, are particularly suitable for sealing seams, since, where appropriate, they can also wet crevices somewhat. Furthermore, thixotropic properties of this coating mixture because of differences in the viscosity in the agitated and the non-agitated state are particularly advantageous because a coating mixture which is comparatively thinly liquid in the agitated state is retained in the form applied in the absence of agitation. Because of the thixotropy, an edge protection coating does not pull back in a planar manner to the large areas of the coated sheet, and the edges of the cut area of the sheet also do not readily approach the edge of the coating mixture. This ensures that the often projecting edges of the cut area still remain covered with the coating mixture according to the invention in a relatively large thickness and are cured in this state. For dry film thicknesses of the covering according to the invention it is advantageous if the coating mixture according to the invention is formulated to be particularly reactive, as a result of which, where appropriate, the adhesive strength can also be improved further.

Before application of the coating mixture for a polymeric covering, an electro-dipcoating substitute can be applied here, e.g. by rolling on, or an electro-dipcoating and optionally beforehand also a pretreatment, such as e.g. a phosphating, can be applied. The cut edge here is often phosphated and in particular coated with a cathodic dipcoating (CDC). If an electro-dipcoating substitute (e.g. so-called "CDC substitute"), which conventionally is not dipped by dipping the object to be coated into a bath for electrically charged deposition of the lacquer, is used, however, the untreated cut edge is usually treated, without prior coating with a pretreatment solution, with the coating mixture for the formation of the polymeric covering, e.g. as edge protection or as sealing of a seam, and thereafter the substrate coated in this way is optionally glued or/and joined in planar form. However, the cut edges regularly present severe corrosion problems here and thus regularly lead to severe under-migration of the lacquer (see FIG. 1).

The metallic substrate, which preferably already has at least two lacquer layers, can be cut, stamped or/and trimmed before the coating mixture for the polymeric covering is applied.

Alternatively, however, the metallic substrate can also first be cut, stamped or/and trimmed and then under certain circumstances subjected to alkaline or/and acid cleaning or pickling, and then, where appropriate, coated with at least one pretreatment solution, such as e.g. based on fluoride or/and phosphate, before the coating mixture for the polymeric covering is applied.

If the coating mixture according to the invention contains water or/and organic solvent, before coating with the coating mixture for the polymeric covering it is advisable to heat the metallic substrate to temperatures in the range from 10 to 120° C. PMT, preferably to temperatures in the range from 25 to 100° C., or to keep it at temperatures in this temperature range if the metallic substrate already has an elevated temperature.

In principle, the surface of the metallic substrate can be covered with the coating mixture for the polymeric covering in the temperature range from −20 to 180° C. PMT.

The coating with the coating mixture according to the invention is in principle carried out under currentless conditions, so that no cathodic or anodic deposition takes place. The composition of the coating mixture according to the invention also is not designed for electrophoretic deposition. From the electrical resistance of the coating mixture or/and the electrical properties of its constituents, it is therefore not sufficiently suitable for use as an electro-dipcoating.

In the process according to the invention, the surface of the metallic substrate can be covered with the coating mixture for the polymeric covering by brushing on, pouring, worm application, spraying, misting, dipping or/and rolling, optionally using a doctor blade, it also being possible for the procedure optionally to be carried out under reduced pressure. In the case of coating of the region of an edge, the coating mixture is preferably applied by pouring without or with a doctor blade, by worm application or/and brush application. In the case of coating of the region of a seam, a soldered point, a weld seam or a repair point, the coating mixture is preferably applied by pouring without or with a doctor blade, by worm application, spraying or/and misting. If appropriate, a repair point is repaired manually. In the case of coating of a strip, the coating mixture is preferably applied by spraying, misting or/and rolling. In the case of coating of a sheet or shaped part, the coating mixture is preferably applied by pouring without or with a doctor blade, by worm application, spraying or/and misting. A worm can have a maximum thickness in particular in the range from 20 to 1,000 µm directly after application and can optionally run immediately or/and later, in particular on increasing the temperature. For edge coating in particular, a nozzle can optionally be used here, the diameter of the nozzle being in the range from half to one and a half times the thickness of the substrate (sheet thickness), preferably a nozzle diameter of 0.5 to 1.5 times the substrate thickness, preferably 0.8 to 1.2 times the substrate thickness. However, this nozzle can also be constructed as a longitudinally pronounced nozzle or as a slit nozzle.

The formation of gas bubbles can be counteracted by working under reduced pressure, by addition of a defoamer and/or establishing a low viscosity. In addition, the coating mixture can optionally be deaerated by vacuum during transfer to containers or/and shortly before application.

The coating mixture for the polymeric covering can have a viscosity in the range from 1,000 to 60,000 mPa·s. The viscosity here—above all in the range from 2,500 to 6,000 mPa·s—can be adjusted in particular by the content of monomers or/and—above all in the range from 4,000 to 60,000 mPa·s—of silica or of similar pigment, but in the case of water-containing mixtures also by changing the pH, such as e.g. by addition of an acid, such as phosphoric acid, or phosphoric acid esters. A polymeric mixture which shows thixotropic behaviour, so that the ability to stand on the edge is increased because the polymeric mixture is thinly liquid only on agitation, is particularly advantageous for coating edges with projecting burrs, in particular cut burrs. The thixotropic behaviour can be achieved by addition e.g. of silica or similar pigment or/and by addition of a thixotropy auxiliary. The region around an edge or around a seam can thereby covered with a significantly more uniform film and complete covering with the polymeric, corrosion-preventing covering on untreated edges can be ensured. The dry film layer thickness here should preferably be at least 20 µm at the sharp edges, in order to achieve an adequate corrosion resistance.

In the process according to the invention, a metallic strip can be coated at a strip running speed in particular in the range from 30 to at least 200 m per minute, it being possible for the application device for the coating mixture or/and the device for the actinic irradiation of the polymeric covering to be held in a fixed position. Nowadays, many strip installations are operated at a speed in the range from 40 to 130 m/min. However, it is foreseeable that in the future several installations will be operated at a speed in the range from 80 to 200 m/min, in particular in the range from 100 to 180 m/min. A prerequisite of increasing the speed e.g. beyond 120 m/min is that particularly high requirements on the installation, on the automation of the process, on the quality of the mixtures employed for coating and on the process reliability are reliably met.

Alternatively, the metallic substrate, in particular a sheet or shaped part, can be moved at a speed in the range from 0.01 to 200 m per minute, it being possible for the application device of the coating mixture or/and the device for the actinic irradiation of the polymeric covering to be held in a fixed position.

Conversely, however, the metallic substrate in this procedure can also be held here in a fixed position and the application device for the coating mixture or/and the device for the actinic irradiation of the polymeric covering, in particular in each case as an automated device, can be moved at a speed in the range from 0.01 to 200 m per minute.

In the process according to the invention, the application device for the coating mixture and the device for the actinic irradiation of the polymeric covering can be coupled to one another, in particular held or guided at the same distance.

After application, the polymeric covering here can advantageously be heated to temperatures which are higher than with the temperature of the metallic substrate on application of the polymeric covering by 1 to 60° C., in order to allow the polymeric covering to flow.

The polymeric covering can be irradiated here with actinic radiation directly after application or later, in particular after drying.

The substrate coated with the polymeric, partly cured covering can then be heated to temperatures in the range from 80 to 180° C. in order to initiate the post-crosslinking reaction in the presence of at least one post-crosslinking compound and to carry out thermal curing. Different temperatures can be used here for initiation of the reaction and for the curing.

The process according to the invention should be employed in such a way that all burrs of the cut edge are covered with the polymeric covering. It was surprising that it is easily possible to provide all burrs with the polymeric covering without the coating mixture at least partly running away from the burrs.

The covering according to the invention and the process according to the invention can also be employed for coating a soldered point, a weld seam or/and a repair point. In the case of soldered points and weld seams, this can be effected, in particular, before coating with an electro-dipcoating. In the case of repair points, however, this can also be used e.g. after mechanical working of defective lacquer areas, e.g. of primer, electro-dipcoating or/and filler which has been abraded off in certain regions. Coating of soldered points, weld seams or/and repair points is preferably carried out largely or entirely as in the case of sealing of a seam or protection of edges.

However, if the metallic components should be coated with a primer with a very high pigment content, such as e.g. a weld primer, instead of with a primer or clear lacquer before soldering or welding, the burning loss and the creation of pores in the soldered or welded areas can be reduced or even avoided entirely. A better electrical conductivity of the areas to be soldered or to be welded is also achieved by this means. The use of a pigment-rich primer, such as e.g. a weld primer, moreover has the advantage that in many cases sealing of a seam inside an inwards-trimmed area by filling, such as e.g. at the edges of doors, can be dispensed with. Subsequent protection with the covering according to the invention has also proved suitable for these areas.

The polymeric, largely or completely cured covering preferably has a layer thickness in the range from 1 to 800 µm. For protection of edges, other areas and for sealing of seams, a layer thickness in the range from 2 to 500 µm, preferably 3 to 200 µm, is of advantage in particular. In the case of automated coating in particular and additionally also in the repair of lacquer damage and similar defects, a layer thickness in the range from 5 to 100 µm, preferably in the range from 10 to 50 µm can be particularly advantageous. The layer thickness can in principle vary within wide ranges in the region of the edge, the other areas or the seam which is to be sealed. If hollow cavities are also at least partly filled here, the layer thicknesses can also be several millimeters, it often being possible for layer thicknesses of up to 5 mm to be irradiated through with actinic radiation and cured readily and also without particular outlay. The polymeric covering can also often have approximately the shape of a drop or an arch in cross-section, so that a uniform layer thickness often cannot be referred to. The layer thickness is preferably in the range from 2 to 500 µm, particularly preferably in the range from 3 to 200 µm, in particular in the range from 4 to 100 µm, the high values often being achieved in the region around the edge on the basis of the drop shape which approximately arises. It is preferable here to coat not only the front face of the edge with the polymeric coating, but also the two side faces to a certain width. In the case of sealing of seams and in the case of other areas, the layer thicknesses can often be kept in the range from 1 to 50 µm, preferably in the range from 1.5 to 30 µm, in particular in the range from 2 to 10 µm. In all cases, the edge of the polymeric covering running out can also have a smaller layer thickness than just mentioned.

After application and at least partial curing of the polymeric covering, at least one coating of in each case at least one electro-dipcoating, electro-dipcoating substitute, lacquer or/and lacquer-like mixture can be applied to the metallic substrate, and, where appropriate, is dried and, where appropriate, cured.

The polymeric, largely or completely cured covering here can experience, where appropriate, a subsequent exposure to heat of at least 140° C., preferably of at least 180° C., and tolerate this without cracking. As the temperature increases here, the risk of cracking increases. This exposure to heat is also preferably tolerated on heating to such a high temperature for half an hour or even for one hour. This action of heat can be necessary, for example, so that e.g. a top lacquer (top coat) can be stoved. In thicker layers or areas of the polymeric covering in particular, cracks can form by this means (see FIG. 3). In the automobile industry, the top lacquer is often stoved e.g. at about 180° C. for half an hour to one hour. It must therefore then be a requirement of the polymeric covering also to withstand such treatments without the occurrence of defects, such as cracks. On the other hand, the subsequent exposure to heat, e.g. in the case of sheets or profiles for the construction industry, is often only in the range from 20 to 65° C. if no lacquer is subsequently applied and stoved.

After application and at least partial curing of the polymeric covering and optionally after application of at least one further coating, an adhesive layer can moreover be applied to the metallic substrate and the metallic substrate prepared in this manner can be glued with at least one other element directly thereafter or later.

The metallic substrate can also be joined to at least one other element e.g. by clinching.

The polymeric, largely or completely cured covering can furthermore be corrosion-resistant such that no rust sites are detectable even after approx. 1,000 h of the salt spray test in accordance with DIN 50021. The polymeric, largely or completely cured covering can be corrosion-resistant such that still no rust sites are detectable after 10 cycles of the alternating climate test in accordance with VDA 621-415, preferably after 20 cycles.

The polymeric, largely or completely cured covering can have an indentation resistance in accordance with DIN EN ISO 2815 in the range from 60 to 150 at a dry film thickness of approximately 100 µm, preferably in the range from 70 to 120, in particular in the range from 80 to 100.

The polymeric, largely or completely cured covering can have an elasticity (deformability) of at least 5 mm in the indentation test in accordance with DIN EN ISO 1520 on sheets of 1 mm thickness, preferably of at least 6 mm. A lower elasticity can be established here by shifting the ratio of low and high molecular weight binders to rather low molecular weight and/or in some cases also by higher contents of monomers and higher contents of photoinitiator; the consequence is, however, a higher hardness and, where appropriate, also a higher adhesive strength. Conversely, however, a higher elasticity can also be established, but in return a lower hardness and also often a lower adhesive strength.

The object is moreover achieved with a covering of a crosslinked mixture prepared by the process according to the invention—in particular by actinic irradiation or actinic irradiation and heat treatment at temperatures of at least 80° C. of the coating mixture applied to a metallic, optionally additionally coated substrate—in particular a coating composition for application of a polymeric, corrosion-preventing covering to a metallic substrate for protection of an edge region and other areas or/and for sealing of the seam of one or more strips, sheets or/and shaped parts optionally joined to one another—and optionally by prior drying.

Finally, the object is achieved with a metallic substrate with a largely or completely cured polymeric covering which has been produced according to the invention.

It was surprising that with a quite "cold" process like the coating with a polymeric covering which can be cured with actinic radiation, it was possible to provide a very corrosion-resistant process, which meets all requirements of edges, other areas or seams, since with alternative coating systems significantly longer drying times are required.

It is particularly advantageous that so-called 100% systems which are largely or entirely free from water or/and organic solvent can be formulated by this means, since these systems can be cured by actinic irradiation directly after application. In particular, this can advantageously be a 100% UV system, where "UV" here is to mean actinic radiation.

A far better corrosion protection than was originally expected resulted on the edges precisely in the presence of burrs.

It was possible here to formulate the polymeric covering to be particularly scratch-resistant, resistant to weathering and resistant to incident UV light, which can indeed be achieved with actinic curing more easily than with thermal curing, but nevertheless is not a matter of course. Furthermore, it has been made possible for the polymeric covering to adhere well to the substrate, and also to a layer of an electric-dipcoating or to a layer containing polyester, such as are frequently used on substrates which are intended for the architectural sector.

It has been possible to formulate the coverings according to the invention—also without a content of post-crosslinking compounds and without subsequent thermal curing—to be corrosion-resistant such that they also showed very good results without pretreatment layers under the polymeric covering. Untreated edges, soldered points, weld seams and repair points and seams with untreated areas were therefore also to be successfully protected against corrosion. The equally good high-quality corrosion prevention is also achieved with very rapid coating on a strip or with rapid automated devices on sheets or shaped parts if—as is usual—crosslinking with actinic radiation is carried out immediately after application of the coating mixture according to the invention.

The metallic substrates provided with a largely or completely cured polymeric covering can be employed in the vehicle, aerospace and space industry, in construction, for exterior facings, roof linings and in fitting out of interiors, for apparatus and machine construction, for cabinet elements and shelving, for domestic appliances, preferably as strip, as sheet, as a shaped part, as lining, as shielding, as a vehicle body or as part of a vehicle body, as a door element, tailgate or engine bonnet, as a bumper, as part of a vehicle, trailer, mobile home or aircraft, as covering, as a piece of furniture or furniture element, as an element of a domestic appliance, such as e.g. of a dishwasher, oven, refrigerator or washing machine, as a frame, as a profile, as a fagade element, as a sandwich panel, as a shaped part of complicated geometry, as a crash barrier, radiator or fencing element, as a garage door element, as housing, as a lamp, as a light, as a traffic light element or as a window, door or bicycle frame.

The process according to the invention can be employed in particular in carcass construction or in vehicle body construction, in a galvanizing line or in a coil coating line, and also in any other production with appropriate coating processes. However, it can also be used—especially in the case of architectural uses—e.g. on small coils or on precut strips or sheets—on site, such as e.g. on a building site by cutting, by coating the metallic substrate in the region of edges or/and seams and by actinic irradiation; ready-coated architectural sheets or profiles which are cut to the final dimensions and coated and cured according to the invention on site can be employed, in particular, here.

FIGURES

FIG. 1 shows a photograph of the cut edge region of two steel sheets, the edge regions of which have been bent downwards, with a view of the upper bent surface, wherein the cut edge (S) itself is in each case detectable on the lower edge. After 10 cycles of an alternating climate test in accordance with VDA 621-415, corrosion phenomena of different intensity due to under-migration of the lacquer, starting from the cut edge, are found. The bottom photograph shows the corrosion phenomena on the sheet which has been protected, after cutting, (only) with a CDC substitute system by wrapping around the edge (prior art), but nevertheless corroded severely in the test. The top photograph shows the sheet provided with a covering according to the invention, on which the cut untreated edge was protected by wrapping around the edge (only) with the polymeric covering according to the invention; even without a pretreatment layer on the cut surface edge, a high resistance to corrosion is already achieved.

Figure 2:
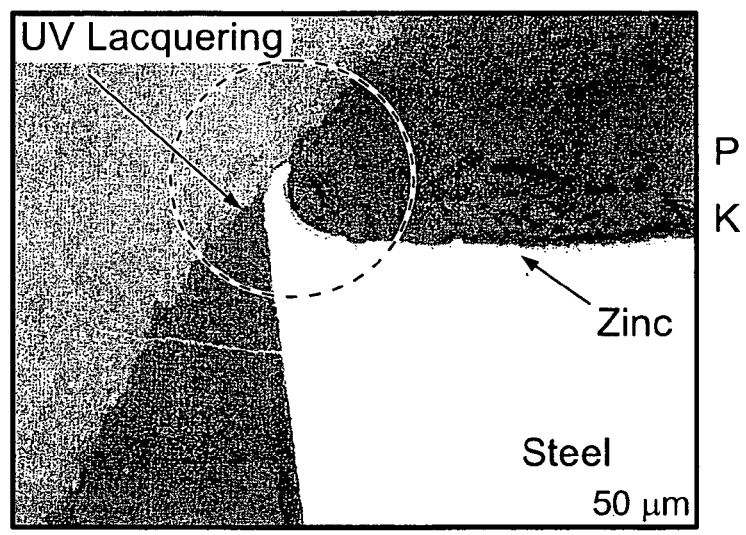

FIG. 2 shows a ground section photograph through an edge region with a burr transversely through a sheet and transversely to the cut edge, which shows that the coating mixture according to the invention can easily run off from the surface of a burr if formulated unsuitably in respect of wettability, temperature or viscosity, so that only a thin coating of the polymeric covering remains stuck to the upper side of the burr. The sheet is galvanized on one surface and coated with a CDC substitute (K) shown as dark grey. The polymeric covering (P) according to the invention shown as dark grey is applied approximately in drop form. The specimen was cast in synthetic resin (medium grey).

Figure 3:
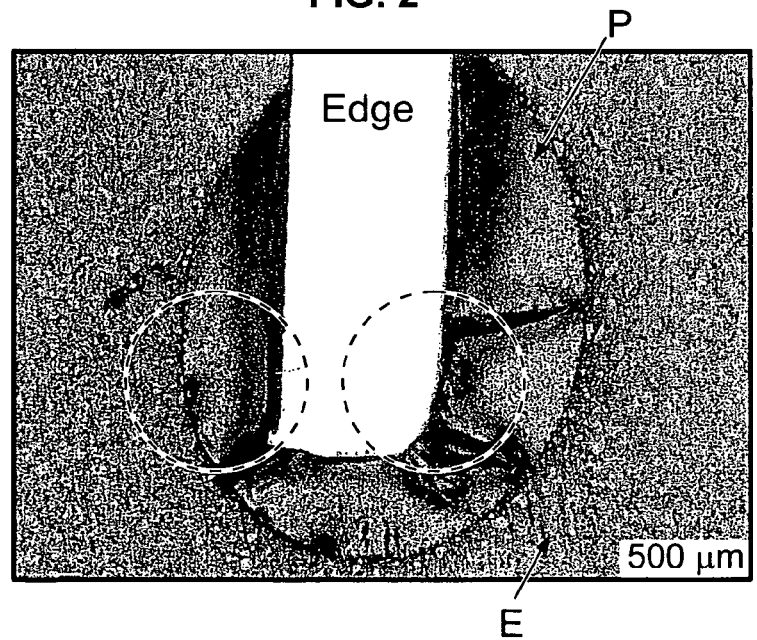

FIG. 3 illustrates the cracks in a ground section photograph (transverse section) which may occur in particular with very thick polymeric coverings according to the invention if the elasticity of the formulation is not matched sufficiently to the requirements especially of thick coatings (more than 500 µm thick). The cracks occur predominantly in the encircled regions of the polymeric covering (P). The specimen was also cast in synthetic resin (E) and only warmed by this procedure.

EXAMPLES AND COMPARISON EXAMPLES

Individual selected embodiments are described by way of example in the following.

Before addition, the solids already present in finely divided form were ground in a bead mill to a fineness of less than 10 µm. The systems for the compositions were prepared in accordance with the examples and comparison examples in table 1. The binders were in the form of mixtures. Binders, monomers and additives were first mixed together and then ground in a bead mill. The content of monomers was only 90 to 95 wt. % of the amount stated in table 1. The finely ground solids were then added. Thereafter, the remaining monomers (5 to 10% of the total monomer content) were added. Finally, the mixture was stirred rapidly and then sieved to 40 µm in order to remove any portions which had dried stuck etc. These compositions were evacuated before transfer to containers, in order to be able to avoid bubbles in the liquid polymeric composition. The water content was up to about 0.1 wt. %, depending on the mixture. In addition, individual experiments were also carried out with the composition of example 6 with a water content of 1 or 4.5 wt. % or with a content of hydrophobic silica of 0.5 or 1 wt. % for a marked increase in the viscosity.

The sheets were to be tested with the examples and comparison examples of tables 1 to 3 with a coating applied to the entire surface, while with those of table 4 an application in the form of edge protection with the approximate cross-section in the form of a drop (in cross-section) was to be tested.

Hot-galvanized steel sheets which were not provided with a pretreatment layer were used for the examples of tables 1 to 3. The composition of the particular coating mixture according to the invention is shown in table 1, and the results of coating and the properties of the coating are to be found in tables 2 and 3. Variants without and also several with an additional post-crosslinking compound were tested in these experiments. At least one of the edges of these sheets was cut. The coating mixture according to the invention was applied by knife coating or spraying. A nozzle diameter of about 1 mm was used for the spraying. Drying was carried out in agitated air at room temperature. The polymeric covering was cured at room temperature with an Hg-doped UV lamp in the wavelength range between 200 and 300 nm at an output of 160 W/cm.

Hot-galvanized and also electrolytically galvanized steel sheets which in only some cases were not provided with a pretreatment layer were used for the examples and comparison examples of table 4. In some of the experiments at least one of the edges of these sheets was cut. The coating mixture according to the invention was applied by a manual process and brought manually into a correspondingly relatively uniform form of the edge protection coating. Drying was carried out in agitated air at room temperature. The polymeric coating was cured at room temperature with an Hg-doped UV lamp in the wavelength range between 200 and 300 nm at an output of 160 W/cm. In the experiments in which no cathodic dipcoating (CDC) and also no multi-layered lacquer build-up had been applied, only the comparatively weak constant climate testing in accordance with DIN 50017 KK, which alone gives appropriate results here, was carried out. Otherwise, the demanding tests—the cyclic alternating climate test in accordance with VDA 621-415 and the salt spray test in accordance with DIN 50021 SS—were carried out only on the CDC-lacquered sheets or sheets completely lacquered with a multi-layered lacquer build-up, since a weaker test, such as the constant climate test, would not have produced results of interest here. The completely lacquered sheets listed in table 4 had the following build-up: 1. electrolytic galvanization, 2. chromium-free pretreatment, 3. primer based on polyester, 4. base coat based on polyester, 5. clear lacquer based on acrylic.

It was found that the coatings based on epoxyacrylate produced relatively poor results in one point because the coating had become partly detached. Good results were produced on the basis of mixtures with a content of epoxyacrylate of less than 50 wt. %, and even very good results in the corrosion resistance in particular. Epoxyacrylate can make the polymeric covering very hard, but under certain circumstances can also give rise to yellowing. The experiments with a content of organic solvent also led to less good results. Specimens based on urethane acrylate or polyester proved to be particularly suitable.

To the Applicant's knowledge, the exceptionally high corrosion prevention has hitherto never before been achieved with a lacquer or lacquer-like material, since after more than 1,000 hours in the salt spray test still no corrosion phenomena at all had manifested themselves (table 4).

TABLE 1

Composition of the coating mixtures according to the invention

| | Example or Comparison example | | | | | | | | | | |
|---|---|---|---|---|---|---|---|---|---|---|---|
| | E 1 | E 2 | E 3 | E 4 | E 5 | E 6 | E 7 | E 8 | E 9 | E 10 | E 11 |
| 1. Urethane acrylate, cures by free radicals, molecular weight 2,000-20,000 | 25 | 27.5 | 30 | 30 | 35 | 45 | 25 | 25 | 25 | 42.8 | 30 |
| 2. Urethane acrylate, cures by free radicals, molecular weight 100-2,500 | 20 | 17.5 | 15 | 15 | 8.5 | — | 20 | 20 | 20 | 21.4 | 15 |
| 3. Epoxyacrylate, cures by free radicals, molecular weight 100-5,000 | — | — | — | — | — | — | — | — | — | — | — |
| 4. 1-Hydroxy-cyclo-hexyl phenyl ketone (photoinitiator) | 7.5 | 7.5 | 7.5 | 5 | 7.5 | 7.5 | 7.5 | 7.5 | 7.5 | 7.1 | 5 |
| 5. Bis(2,6-dimethoxy-benzoyl)-2,4,4-trimethylpentylphosphine oxide (photoinitiator) | — | — | — | 2.5 | — | — | — | — | — | 3.6 | 2.5 |
| 6. Hydroxypropyl methacrylate monomer (HPMA), monofunctional | 29.9 | 29.9 | 29.9 | 29.9 | — | — | 27.9 | 24.9 | 19.9 | — | — |
| 7. Isobornyl acrylate monomer, monofunctional | — | — | — | — | 30.9 | 29.4 | — | — | — | — | — |
| 8. Hexanediol diacrylate monomer (HDDA), difunctional | — | — | — | — | — | — | — | — | — | — | 29.9 |
| 9. Phosphoric acid ester (adhesion promoter) | 10 | 10 | 10 | 10 | 10 | 10 | 10 | 10 | 10 | 14.3 | 10 |
| 10. Polyether-modified polydimethylsiloxane (wetting additive and defoamer) | 0.1 | 0.1 | 0.1 | 0.1 | 0.1 | 0.1 | 0.1 | 0.1 | 0.1 | 0.1 | 0.1 |
| 11. Silicate pigment modified with calcium ions | 5 | 5 | 5 | 5 | 5 | 5 | 5 | 5 | 5 | 7.1 | 5 |
| 12. Hydrophobic silica | 2.5 | 2.5 | 2.5 | 2.5 | 3 | 3 | 2.5 | 2.5 | 2.5 | 3.6 | 2.5 |
| 13. Polyfunctional isocyanurate based on HDI (hexamethylene-diisocyanate, post-crosslinking) | — | — | — | — | — | 2 | 5 | 10 | — | — | — |
| 14. Butyl acetate (solvent) | — | — | — | — | — | — | — | — | — | 49.1 | 10 |

| | Example or comparison example | | | | | | | | | | |
|---|---|---|---|---|---|---|---|---|---|---|---|
| | E 12 | E 13 | E 14 | E 15 | E 16 | E 17 | E 18 | E 19 | E 20 | E 21 | E 22 |
| 1. Urethane acrylate, cures by free radicals, molecular weight 2,000-20,000 | 25 | 25 | 25 | 39.9 | 30 | — | — | 20 | 20 | 27.5 | — |
| 2. Urethane acrylate, cures by free radicals, molecular weight 100-2,500 | 20 | 20 | 20 | 20 | 15 | — | — | — | — | — | — |
| 3. Epoxyacrylate, cures by free radicals, molecular weight 100-5,000 | — | — | — | — | — | — | — | — | — | 17.5 | 45 |
| 3a. Polyester acrylate, cures by free radicals, molecular weight 100-5,000 | — | — | — | — | — | 45 | 45 | 25 | 25 | — | — |
| 4. 1-Hydroxy-cyclo-hexyl phenyl ketone (photoinitiator) | 7.5 | 7.5 | 7.5 | 6.7 | 5 | 7.5 | 7.5 | 7.5 | 7.5 | 7.5 | 7.5 |
| 5. Bis(2,6-dimethoxy-benzoyl)-2,4,4-trimethylpentylphosphine oxide (photoinitiator) | — | — | — | 3.3 | 2.5 | — | — | — | — | — | — |
| 6. Hydroxypropyl methacrylate monomer (HPMA), monofunctional | 27.9 | 24.9 | 19.9 | — | — | 29.9 | 24.9 | 29.9 | 24.9 | — | — |
| 7. Isobornyl acrylate monomer, monofunctional | — | — | — | — | — | — | — | — | — | — | — |
| 8. Hexanediol diacrylate monomer (HDDA), difunctional | — | — | — | 24.9 | — | — | — | — | — | 29.9 | 29.9 |
| 9. Phosphoric acid ester (adhesion promoter) | 10 | 10 | 10 | 13.3 | 10 | 10 | 10 | 10 | 10 | 10 | 10 |

TABLE 1-continued

Composition of the coating mixtures according to the invention

| | | | | | | | | | | | |
|---|---|---|---|---|---|---|---|---|---|---|---|
| 10. Polyether-modified polydimethylsiloxane (wetting additive and defoamer) | 0.1 | 0.1 | 0.1 | 0.1 | 0.1 | 0.1 | 0.1 | 0.1 | 0.1 | 0.1 | 0.1 |
| 11. Silicate pigment modified with calcium ions | 5 | 5 | 5 | 6.7 | 5 | 5 | 5 | 5 | 5 | 5 | 5 |
| 12. Hydrophobic silica | 2.5 | 2.5 | 2.5 | 3.3 | 2.5 | 2.5 | 2.5 | 2.5 | 2.5 | 2.5 | 2.5 |
| 13. Polyfunctional isocyanurate based on HDI (hexamethylene diisocyanate, post-crosslinking, masked) | 2 | 5 | 10 | 6.7 | 5 | — | 5 | — | 5 | — | — |
| 14. Butyl acetate (solvent) | — | — | — | 39.1 | 5 | — | — | — | — | — | — |

TABLE 2

Properties of the coverings according to the invention with variation in the layer composition

| Properties | E 1 | E 2 | E 3 | E 4 | E 5 | E 6 | E 7 | E 8 | E 9 | E 10 | E 11 |
|---|---|---|---|---|---|---|---|---|---|---|---|
| Viscosity range at room temperature in mPa · s | 3,000-3,500 | 3,000-3,500 | 3,500-4,000 | 3,500-4,000 | 4,000-4,500 | 4,500-5,000 | 3,000-3,500 | 3,000-3,500 | 3,000-3,500 | 1,000-1,500 | 3,000-3,500 |
| Dry film thickness in μm, approximate | 20 | 20 | 20 | 20 | 20 | 20 | 20 | 20 | 20 | 20 | 20 |
| Elasticity of the covering in mm: indentation test in accordance with DIN EN ISO 1520 | 6.5 | 7 | 7.5 | 8 | 8.5 | 9.5 | 7.2 | 7 | 6.5 | 6 | 6.5 |
| Adhesive strength of the covering on the substrate: peel off Tesa tape from the edge lacquer | good | good | good | very good | very good | excellent | good | good | good | good | good |
| Hardness of the covering by scratching on the edge | elastic | elastic | elastic | elastic | very elastic | exceptionally elastic | hard | hard | very hard | very hard | very hard |
| Salt spray test in accordance with DIN 50021 SS, flat specimen after 500 h or in the same way after 1,000 h | good | good | good | good | very good | very good | very good | very good | very good | good | Poor |
| Lacquer adhesion after corrosion prevention with adhesive tape | good | good | good | good | very good | very good | very good | very good | very good | good | Poor |
| Resistance to weathering: 6 months weathering in the open Oppenau | good | good | good | good | good | good | good | good | very good | good | Good |
| Over-lacquerability with CDC, visual evaluation | good | good | good | good | good | good | good | good | good | good | Good |

| Properties | E 12 | E 13 | E 14 | E 15 | E 16 | E 17 | E 18 | E 19 | E 20 | E 21 | E 22 |
|---|---|---|---|---|---|---|---|---|---|---|---|
| Viscosity range at room temperature in mPa · s | 3,000-3,500 | 3,000-3,500 | 3,000-3,500 | 1,500-2,000 | 2,500-3,000 | 3,500-4,000 | 3,500-4,000 | 3,000-3,500 | 3,000-3,500 | 3,000-3,500 | 3,500-4,000 |
| Dry film thickness in μm, approx. | 20 | 20 | 20 | 20 | 20 | 20 | 20 | 20 | 20 | 20 | 20 |
| Elasticity of the covering in mm: indentation test in accordance with DIN EN ISO 1520 | 7.2 | 7 | 6.5 | 9 | 8.5 | 8.5 | 9 | 7.5 | 8 | 5.2 | 4.5 |
| Adhesive strength of the covering on the substrate: peel off Tesa tape from the edge lacquer | good | good | good | good | good | good | good | good | good | poor | poor |
| Hardness of the covering by scratching on the edge | hard | hard | very hard | elastic | elastic | elastic | exceptionally hard | hard | exceptionally hard | very hard | very hard |

TABLE 2-continued

Properties of the coverings according to the invention with variation in the layer composition

| | | | | | | | | | | | |
|---|---|---|---|---|---|---|---|---|---|---|---|
| Salt spray test in accordance with DIN 50021 SS, flat specimen after 500 h or in the same way after 1,000 h | very good | very good | very good | good | good | very good | very good | very good | very good | very poor | very poor |
| Lacquer adhesion after corrosion prevention with adhesive tape | very good | very good | very good | good | very good | very good | very good | very good | very good | very poor | very poor |
| Resistance to weathering: 6 months weathering in the open Oppenau | good | good | very good | moderate | moderate | good | good | good | good | yellows severely | yellows severely |
| Over-lacquerability with CDC, visual evaluation | good | good | good | good | good | good | good | good | good | good | good |

TABLE 3

Properties of the coverings according to the invention with variation in the dry film thickness and contents of the crosslinking type

| Properties | E 23 | E 5 | E 24 | E 25 | E 6 | E 26 | E 27 | E 8 | E 28 |
|---|---|---|---|---|---|---|---|---|---|
| Composition | Mixture according to E 5 | | | Mixture according to E 6 | | | Mixture according to E 8 | | |
| Dry film thickness in um | 10 | 20 | 30 | 10 | 20 | 30 | 10 | 20 | 30 |
| Content of UV curing, % | 100 | 100 | 100 | 100 | 100 | 100 | 95 | 95 | 95 |
| Content of post-crosslinking, % | 0 | 0 | 0 | 0 | 0 | 0 | 5 | 5 | 5 |
| Elasticity of the covering in mm: indentation test in accordance with DIN EN ISO 1520 | 9 | 8.5 | 7 | 10 | 9.5 | 8 | 8 | 7 | 5.8 |
| Adhesive strength of the covering on the substrate: peel off Tesa tape from the edge lacquer | very good | very good | very good | excellent | excellent | excellent | good | good | good |
| Hardness of the covering: scratching on the edge | elastic | very elastic | particularly elastic | very elastic | exceptionally elastic | exceptionally elastic | hard | hard | hard |
| Salt spray test in accordance with DIN 50021 SS, flat sample after 500 h and after 1,000 h | very good | very good | excellent | very good | very good | very good | good | very good | very good |
| Lacquer adhesion after corrosion prevention with adhesive tape | very good | very good | very good | very good | very good | very good | very good | very good | good |
| Resistance to weathering: 6 months weathering in the open Oppenau | good | good | good | good | good | good | good | good | good |
| Over-lacquerability with CDC, visual evaluation | good | good | good | good | good | good | good | good | good |

TABLE 4

Coating sequence on edges of steel sheets and results of the corrosion prevention tests

| Example | Substrate: steel with | Phosphating, after-rinsing solution | CDC 18 μm, containing Pb | Edge cut? | Edge protection according to example 6 | DIN 50017 KK 1,008 h | VDA 621-415 5 rounds | VDA 621-415 10 rounds | DIN 50021 SS 504 h | DIN 50021 SS 1,008 h |
|---|---|---|---|---|---|---|---|---|---|---|
| | | | | | | | Under-migration in mm | | | |
| CE 31 | Z | type 1 | no | no | no | 2.5 | N/A | N/A | N/A | N/A |
| CE 32 | Z | type 1 | no | yes | no | <1 | N/A | N/A | N/A | N/A |
| E 31 | Z | type 1 | no | no | yes | 0 | N/A | N/A | N/A | N/A |
| E 32 | Z | type 1 | no | yes | yes | 0 | N/A | N/A | N/A | N/A |
| CE 33 | Z | type 1 | yes | no | no | N/A | <1 | <1 | <1 | 1 |
| CE 34 | Z | type 1 | yes | yes | no | N/A | <1 | 1 | 2 | 3 |
| E 33 | Z | type 1 | yes | no | yes | N/A | 0 | 0 | 0 | 0 |
| E 34 | Z | type 1 | yes | yes | yes | N/A | 0 | 0 | 0 | 0 |
| CE 35 | ZE | type 2 | no | no | no | 0.5 | N/A | N/A | N/A | N/A |
| CE 36 | ZE | type 2 | no | yes | no | 1 | N/A | N/A | N/A | N/A |
| E 35 | ZE | type 2 | no | no | yes | 0 | N/A | N/A | N/A | N/A |
| E 36 | ZE | type 2 | no | yes | yes | 0 | N/A | N/A | N/A | N/A |
| CE 37 | ZE | type 2 | yes | no | no | N/A | <1 | 1.5 | 1 | 2.5 |

TABLE 4-continued

Coating sequence on edges of steel sheets and results of the corrosion prevention tests

| Example | Substrate: steel with | Phosphating, after-rinsing solution | CDC 18 μm, containing Pb | Edge cut? | Edge protection according to example 6 | DIN 50017 KK 1,008 h | VDA 621-415 5 rounds | VDA 621-415 10 rounds | DIN 50021 SS 504 h | DIN 50021 SS 1,008 h |
|---|---|---|---|---|---|---|---|---|---|---|
| | | | | | | | Under-migration in mm | | | |
| CE 38 | ZE | type 2 | yes | yes | no | N/A | <1 | 2 | 4 | 6.5 |
| E 37 | ZE | type 2 | yes | no | yes | N/A | 0 | 0 | 0 | 0 |
| E 38 | ZE | type 2 | yes | yes | yes | N/A | 0 | 0 | 0 | 0 |
| CE 39 | ZE | type 3 | completely lacquered sheet | yes | no | N/A | <1 | 1 | 1 | 2.5 |
| E 39 | ZE | type 3 | completely lacquered sheet | yes | yes | N/A | 0 | 0 | 0 | 0 |

Z = hot-galvanized
ZE = electrolytically galvanized
N/A = not carried out
Phosphating and after-rinsing solution:
Type 1: Trication phosphating without fluoride and subsequent fluoride-containing after-rinsing solution
Type 2: Trication phosphating with fluoride and subsequent fluoride-containing after-rinsing solution
Type 3: Chromium-free phosphate-containing pretreatment without subsequently applied after-rinsing solution

The invention claimed is:

1. A composition comprising:
   45 wt. % of a urethane acrylate with a molecular weight of 2,000 to 20,000;
   7.5 wt. % 1-Hydroxy-cyclo-hexyl phenyl ketone;
   29.4 wt. % isobornyl acrylate monofunctional monomer;
   10 wt. % phosphoric acid ester;
   0.1 wt. % polyether-modified polydimethylsiloxane;
   5 wt. % silicate pigment modified with calcium ions; and
   3 wt. % hydrophobic silica.

2. The composition of claim 1, having a viscosity in the range of from 4,500-5,000 mPa·s at room temperature.

3. A coating mixture comprising:
   from 20-60% by weight of a radically polymerizable binder containing double bonds, wherein the binder comprises at least one member selected from the group consisting of a urethane acrylate, an epoxyacrylate and a polyester acrylate;
   about 6.7% by weight of a corrosion prevention pigment comprising a silicate modified with calcium ions;
   about 13.3% by weight of an adhesion promoting phosphoric acid ester;
   a photoinitiator; and
   water, and
   wherein the coating mixture has a pH, has a dry weight and contains a sufficient amount of phosphoric acid ester to pickle a metallic substrate to which it is applied, and wherein the coating mixture has one or more of the following features:
   the radically polymerizable binder comprises at least two urethane acrylates, wherein one of the two urethane acrylates has a molecular weight in the range of about 2000 to about 20,000, and/or the other urethane acrylate has a molecular weight in the range of about 100 to about 2,500, and
   the photoinitiator comprises two photoinitiator compounds, where one of the two photoinitiator compounds is 1-hydroxy cyclohexyl phenyl ketone, and the other photoinitiator compound is bis(2,6-dimethoxybenzoyl)-2,4,4-trimethylpentyl-phosphine oxide;
   wherein:
   the urethane acrylate having a molecular weight in the range of about 2000 to about 20,000 is in an amount of about 39.9% by weight, and the urethane acrylate having a molecular weight in the range of about 100 to about 2,500 is in an amount of about 20% by weight; and
   the 1-hydroxy-cyclohexyl phenyl ketone is in an amount of about 6.7% by weight, and the bis(2,6-dimethoxybenzoyl)-2,4,4-trimethylpentylphosphine oxide is in an amount of about 3.3% by weight.

4. A coated metallic sheet comprising a metallic sheet which comprises at least one of aluminum, steel, an alloy comprising aluminum, iron, magnesium, titanium or zinc and a coating in a cut edge region proximate a cut edge of the metallic sheet formed by applying the coating mixture of claim 3, wherein the coating mixture is applied in the region of the cut edge of the metallic sheet.

5. A metallic substrate with a largely or completely cured polymeric covering formed from the mixture of claim 3, wherein the mixture has a water content of 1 to 4.5%.

6. A method for protecting a cut edge of a metallic substrate comprising the steps of:
   coating a substrate having said cut edge with the coating mixture of claim 3, whereby the cut edge is coated with a polymeric covering formed by the coating mixture.

7. The method as in claim 6 wherein the cut edge comprises burrs, and wherein said burrs are covered with a polymeric covering.

8. The coating mixture of claim 3, further comprising at least one post-crosslinking compound.

9. A coated metallic sheet comprising a metallic sheet which comprises at least one of aluminum, steel, an alloy comprising aluminum, iron, magnesium, titanium or zinc and a coating in a cut edge region proximate a cut edge of the metallic sheet formed by applying the coating mixture of claim 8, wherein the coating mixture is applied in the region of the cut edge of the metallic sheet.

10. A metallic substrate with a largely or completely cured polymeric covering formed from the mixture of claim 8, wherein the mixture has a water content of 1 to 4.5%.

11. A method for protecting a cut edge of a metallic substrate comprising the steps of:
   coating a substrate having said cut edge with the coating mixture of claim 8, whereby the cut edge is coated with a polymeric covering formed by the coating mixture.

12. The method as in claim 11 wherein the cut edge comprises burrs, and wherein said burrs are covered with the polymeric covering.

13. A composition comprising:
35 wt. % of a urethane acrylate with a molecular weight of 2,000 to 20,000;
8.5 wt. % of a urethane acrylate with a molecular weight of 100 to 2500;
7.5 wt. % 1-Hydroxy-cyclo-hexyl phenyl ketone;
30.9 wt. % isobornyl acrylate monofunctional monomer;
10 wt. % phosphoric acid ester;
0.1 wt. % polyether-modified polydimethylsiloxane;
5 wt. % silicate pigment modified with calcium ions; and
3 wt. % hydrophobic silica.

* * * * *

UNITED STATES PATENT AND TRADEMARK OFFICE
CERTIFICATE OF CORRECTION

| | | |
|---|---|---|
| PATENT NO. | : 9,598,530 B2 | Page 1 of 1 |
| APPLICATION NO. | : 11/867272 | |
| DATED | : March 21, 2017 | |
| INVENTOR(S) | : Georg Gros et al. | |

It is certified that error appears in the above-identified patent and that said Letters Patent is hereby corrected as shown below:

In the Claims

Claim 7, Lines 46-47, read "covered with a polymeric covering" and should read -- covered with the polymeric covering --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*